(No Model.)
W. BROOKES.
INFLATING VALVE FOR PNEUMATIC TIRES.
No. 564,502. Patented July 21, 1896.
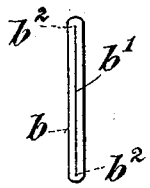
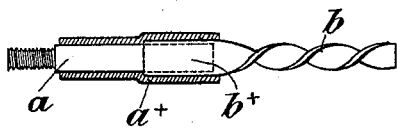
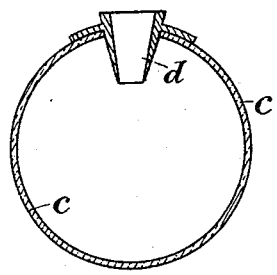
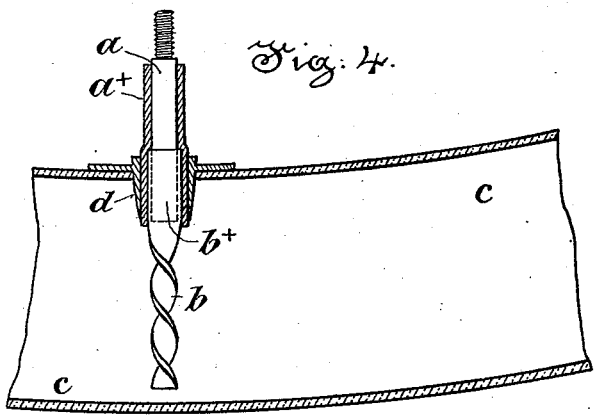
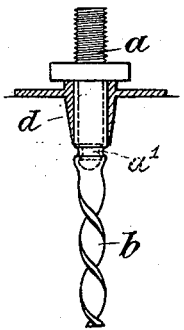
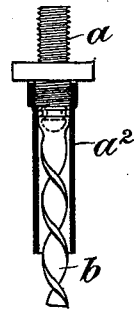
Witnesses
Geo. C. Abby
Louis Wenke
Inventor
Warwick Brookes
By his attorneys
Howson & Howson

UNITED STATES PATENT OFFICE.

WARWICK BROOKES, OF MANCHESTER, ENGLAND.

INFLATING-VALVE FOR PNEUMATIC TIRES.

SPECIFICATION forming part of Letters Patent No. 564,502, dated July 21, 1896.

Application filed March 30, 1896. Serial No. 585,454. (No model.)

*To all whom it may concern:*

Be it known that I, WARWICK BROOKES, a subject of the Queen of Great Britain, residing at Manchester, in the county of Lancaster, England, have invented improvements in or relating to valves for the inflaters of pneumatic tires and other articles requiring inflation or distension, of which the following is a specification.

This invention relates principally to the inflation of pneumatic tires for wheels, but it is also applicable to the inflation or distension of other articles; and the invention consists of an improved valve and improved means of securing such valve into the tube or other article to be inflated or distended.

The invention will be readily understood from the following description on reference to the annexed drawings, of which—

Figure 1 is an enlarged view of the end of the india-rubber tubing forming the principal part of the valve proper shown on Fig. 2. Fig. 3 illustrates in section means for applying my improved valve to the inner tube of a pneumatic tire for wheels. Fig. 4 illustrates the valve applied thereto. Figs. 5 and 6 show modifications, hereinafter more particularly referred to.

The valve proper consists of a rigid tube $a$, of suitable material, diameter, and length upon which is fitted and firmly secured a flexible elastic tube $b$, formed in section, as seen at Fig. 1, that is to say, flat or ribbon-shaped, with a central slit $b'$, the ends or edges $b^2$ of which are perfectly sharp. The inner sides of the split tube touch each other, and such contact is further insured by twisting or coiling this flat section-tube or otherwise forming a similar tube before vulcanization, so that after vulcanization it assumes a shape similar or equivalent to that shown on Figs. 2 and 4.

The end $b^\times$ of the flexible elastic tube $b$ may be applied to the rigid tube $a$ by distending the former and forcing it over the said tube $a$, or the end $b^\times$ may be formed open or circular in section during the manufacture of the flexible elastic part $b$ $b^\times$ of the valve. An india-rubber tube $a^\times$ may be provided to cover part of the rigid nozzle $a$ and the end $b^\times$ of the flexible tube.

The pneumatic tube $c$ is made or provided with means for holding the valve $a$ $b$ in an air-tight socket of suitable form. I make this socket of india-ruber or equivalent elastic material in the form of a tube $d$ slightly less in diameter than the end of the tube $a$ with the part $b^\times$ fixed thereon. I further cone or reduce the internal diameter of the tube or socket $d$, as seen at Fig. 3, and I prefer to reduce the inner end of the tube or socket $d$ to a feather-edge, as shown, so that the valve $a$ $b$ $b^\times$ when inserted into the pneumatic tube $c$, as seen at Fig. 4, with the part $b$ contained in the tube $c$ and the part $a$ projecting therefrom, the tube or socket $d$ will hold the part $b^\times$ and the inner end of the tube or nozzle $a$ firmly, and no air can escape between the parts $d$ and $b^\times$ or $d$ and $a^\times$, as the pressure of the air will be exerted against the side of the socket $d$.

In some cases a groove $a'$ may be made around the inner end of the tube $a$ to hold the part $b^\times$ thereon more firmly, or the inner end of $a$ may be otherwise made with a bulb or its equivalent, as seen at Fig. 5. In some cases also the part $b$ may be protected by a metal tubular cover $a^2$, as seen at Fig. 6.

On applying an air-pump or inflater to the projecting end of $a$ air will pass readily through the slit in the length of the coiled or twisted part $b$, but cannot return as the coiling or twisting of the part $b$ will tend to keep the slit firmly closed. To deflate the tube $c$, all that is required is to withdraw or partly withdraw the valve from the socket $d$, or, in the case shown at Fig. 6, to loosen $a$ from $a^2$.

It will be evident without further illustration that this valve and socket can be applied to any article (other than a pneumatic tube) which requires inflation or distension by a back-pressure valve.

I am aware that flattened india-rubber valves have been used as back-pressure valves, but I do not make any claim to such a valve, but only to such flattened valve when twisted or coiled as above described.

I claim as my invention—

1. A back-pressure valve formed principally of a flexible and elastic flattened helically-formed tube substantially as hereinbefore set forth.

2. The combination with a back-pressure valve formed with a rigid nozzle and helically-formed flattened flexible elastic tube of an elastic socket fixed to the article to which the valve is to be applied, such socket being of such diameter and so tapered at its inner
5 end as to grip the said valve and form an airtight joint therewith, substantially as hereinbefore set forth.

In testimony whereof I have signed my name to this specification in the presence of two subscribing witnesses.

WARWICK BROOKES.

Witnesses:
GEORGE DAVIES,
CHARLES A. DAVIES.